(12) United States Patent  
Strehovsky et al.

(10) Patent No.: US 9,292,270 B2
(45) Date of Patent: Mar. 22, 2016

(54) SUPPORTING DYNAMIC BEHAVIOR IN STATICALLY COMPILED PROGRAMS

(71) Applicant: Microsoft Corporation, Redmond, WA (US)

(72) Inventors: Michal Strehovsky, Redmond, WA (US); David Charles Wrighton, Redmond, WA (US); Atsushi Kanamori, Redmond, WA (US); Mircea Trofin, Sammamish, WA (US); Rudi Martin, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 131 days.

(21) Appl. No.: 14/227,036

(22) Filed: Mar. 27, 2014

(65) Prior Publication Data

US 2015/0277881 A1    Oct. 1, 2015

(51) Int. Cl.
*G06F 9/45* (2006.01)
(52) U.S. Cl.
CPC . *G06F 8/49* (2013.01); *G06F 8/458* (2013.01)
(58) Field of Classification Search
CPC ........................................................ G06F 8/49
See application file for complete search history.

(56) References Cited

U.S. PATENT DOCUMENTS

| | | | |
|---|---|---|---|
| 6,305,012 B1 * | 10/2001 | Beadle ................ | G06F 9/45516 717/148 |
| 6,637,025 B1 * | 10/2003 | Beadle ................ | G06F 9/45504 717/148 |
| 7,716,246 B2 | 5/2010 | Pepin | |
| 8,539,457 B2 | 9/2013 | Hamby et al. | |
| 9,116,712 B2 * | 8/2015 | Miller ..................... | G06F 8/423 |
| 2005/0216885 A1 | 9/2005 | Ireland et al. | |
| 2007/0233668 A1 | 10/2007 | Osipov | |
| 2008/0127070 A1 | 5/2008 | Barcia et al. | |
| 2008/0127303 A1 | 5/2008 | Wrighton et al. | |
| 2008/0147698 A1 | 6/2008 | Gustafsson et al. | |
| 2009/0193392 A1 | 7/2009 | Downen et al. | |
| 2009/0319554 A1 | 12/2009 | Krishnaswamy et al. | |
| 2010/0088665 A1 | 4/2010 | Langworthy et al. | |
| 2010/0088672 A1 | 4/2010 | Langworthy et al. | |
| 2010/0095284 A1 | 4/2010 | Herring et al. | |

(Continued)

OTHER PUBLICATIONS

Lyon, Douglas, "Semantic Annotation for Java", in Journal of Object Technology, vol. 9, Issue 3, May 2010, 11 pages.

(Continued)

*Primary Examiner* — Philip Wang
(74) *Attorney, Agent, or Firm* — Kevin Sullivan; Kate Drakos; Micky Minhas (57) ABSTRACT

Support for dynamic behavior is provided during static compilation while reducing reliance on JIT compilation and large runtimes. A mapping is created between metadata and native code runtime artifacts, such as between type definition metadata and a runtime type description, or between method definition metadata, a runtime type description, and a native code method location, or field definition metadata, a runtime type description, and a field location. A mapping between runtime artifacts may also be created. Some compilation results include trampoline code to support a reflection invocation of an artifact in the reduced runtime support environment, for virtual method calls, call-time bounds checking, calling convention conversion, or compiler-intrinsic methods. Some results support runtime diagnostics by including certain metadata even when full dynamic behavior is not supported.

20 Claims, 3 Drawing Sheets

(56) References Cited

U.S. PATENT DOCUMENTS

| | | | | |
|---|---|---|---|---|
| 2010/0125558 | A1* | 5/2010 | Trofin | G06F 8/36 707/706 |
| 2010/0299300 | A1* | 11/2010 | Wolf | G06N 5/02 706/46 |
| 2011/0307520 | A1 | 12/2011 | Trofin et al. | |
| 2012/0060148 | A1 | 3/2012 | Jones et al. | |
| 2012/0210300 | A1* | 8/2012 | Trofin | G06F 8/72 717/120 |
| 2012/0323858 | A1 | 12/2012 | Nagarkar et al. | |
| 2013/0103651 | A1 | 4/2013 | Jha et al. | |
| 2013/0263099 | A1 | 10/2013 | Box et al. | |
| 2013/0339928 | A1* | 12/2013 | Trofin | G06F 9/44521 717/122 |
| 2014/0082597 | A1* | 3/2014 | Chafi | G06F 8/443 717/148 |
| 2015/0277899 | A1* | 10/2015 | Hamby | G06F 8/70 717/120 |

OTHER PUBLICATIONS

Giacobazzi, Roberto, "'Optimal' Collecting Semantics for Analysis in a Hierarchy of Logic Program Semantics", in Proceedings of the 13th International Symposium on Theoretical Aspects of Computer Science (STACS), Feb. 22, 1996, 12 pages.

"Method Base.Invoke Method (Object, Object☐)", retrieved from <<http://msdn.microsoft.com/en-us/library/a89hcwhh(v=vs.110).aspx>>, no later than Mar. 17, 2014, 5 pages.

Gowing, et al., "Meta-Object Protocols for C++: The Iguana Approach", in Proceedings of Reflection, Apr. 1, 1996, pp. 1-16.

Daumler, et al., "Reducing Startup Time of a Deterministic Virtualizing Runtime Environment", in Proceedings of the 16th International Workshop on Software and Compliers for Embedded Systems, Jan. 1, 2013, pp. 48-57.

"International Search Report and Written Opinion Issued for PCT Patent Application No. PCT/US2015/022106", Mailed Date: Jun. 1, 2015, 15 pages.

Zhao, et al., "The HipHop compiler for PHP", in Proceedings of the ACM International Conference on Object Oriented Programming Systems Languages and Applications, Jan. 1, 2012, 11 pages.

Lesnicki, et al., "Split Compilation: an Application to Just-in-Time Vectorization", In International Workshop on GCC for Research in Embedded and Parallel Systems, Sep. 2007, 7 pages.

Lyon, Douglas, "Semantic Annotation for Java", In Journal of Object Technology, vol. 9, Issue 3, May, 2010, 11 pages.

Pawlak, Renaud, "Spoon: Compile-time Annotation Processing for Middleware", Nov. 2006, 21 pages.

Giacobazzi, et al., "Generalized Semantics And Abstract Interpretation For Constraint Logic Programs", In Journal of Logical Programming, vol. 25, Issue 3, Dec. 1995, 60 pages.

Giacobazzi, Roberto, " 'Optimal' Collecting Semantics for Analysis in a Hierarchy of Logic Program Semantics", In Proceedings of the 13th International Symposium on Theoretical Aspects of Computer Science (STACS), Feb. 22, 1996, 12 pages.

Kiyavitskaya, et al., "Semi-Automatic Semantic Annotations for Web Documents", In Proceedings of 2nd Italian Semantic Web Workshop, 2005, 15 pages.

Chiba, et al., "An Easy-to-Use Toolkit for Efficient Java Bytecode Translators", In Proceedings of the 2nd International Conference on Generative Programming and Component Engineering, Sep. 22, 2003, 14 pages.

Fahndrich, et al., "Reflective Program Generation with Patterns", In Proceedings of the 5th International Conference on Generative Programming and Component Engineering, Oct. 22, 2006, 10 pages.

Chisnall, David, "Smalltalk in a C World", In Proceedings of the International Workshop on Smalltalk Technologies, Aug. 28, 2012, 12 pages.

"Method Base. Invoke Method (Object, Object☐)", retrieved from <<http://msdn.microsoft.com/en-us/library/a89hcwhh(v=vs.110).aspx>>, no later than Mar. 17, 2014, 5 pages.

"Dynamic Programming in the .Net Framework", retrieved from <<http://msdn.microsoft.com/en-us/library/hh156524(v=vs.110).aspx>>, no later than Mar. 5, 2014, 18 pages.

"Limitations | Xamarin", retrieved from <<http://docs.xamarin.com/guides/ios/advanced_topics/limitations/>>, copyright 2013, 3 pages.

"Reflection in .Net—CodeProject", retrieved from <<http://www.codeproject.com/Articles/55710/Reflection-in-NET>>, Feb. 9, 2010, 15 pages.

"How to: Use Svcutil.exe to Export Metadata from Compiled Service Code", retrieved from <<http://msdn.microsoft.com/en-us/library/aa702581(v=vs.110).aspx>>, Aug. 2, 2012, 4 pages.

"Dynamic vs Static Compiler (JavaScript)", retrieved from <<http://www.4mghc.com/threads/289411-Dynamic-vs-Static-Compiler-JavaScript>>, Feb. 24, 2014, 3 pages.

Laurence Tratt, "Dynamically Typed Languages", retrieved from <<http://eprints.bournemouth.ac.uk/10668/1/tratt_dynamically_typed_languages.pdf>>, Mar. 13, 2009, 33 pages.

"Second Written Opinion Issued in PCT Application No. PCT/US2015/022106", Mailed Date: Dec. 7, 2015, 7 Pages.

* cited by examiner

SUPPORTING DYNAMIC BEHAVIOR IN STATICALLY COMPILED PROGRAMS

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

INCORPORATION BY REFERENCE

To the extent permitted by applicable law in the relevant jurisdiction, the present disclosure incorporates herein by reference the entirety of commonly owned U.S. patent application Ser. No. 14/227,029 filed Mar. 27, 2014 ("the '029 application").

BACKGROUND

Some computer program environments provide runtime support for reflection, type introspection, dynamic dispatch, dynamic type-checking, and/or other dynamic behaviors. Dynamic dispatch involves selecting at runtime which implementation of a polymorphic method (or function) is called from a given invocation. Type introspection involves a running program examining its own values, metadata, properties, and/or functions; reflection goes further because it involves a running program altering its own values, metadata, properties, and/or functions. Dynamic type-checking involves verifying type-safety of a program while the program is running. Some environments rely on Just-in-time (JIT) compilation to support dynamic behavior by compiling code for a program while the program is running; the compiled code may be native code or it may be higher-level code which is then interpreted, for example.

Balancing dynamic and static features in an environment can be challenging. Balance is sometimes possible, in the sense that a program with dynamic behaviors may also have features such as static type-checking, static compilation, and/or creation of an executable application all of whose components have been identified during an ahead-of-time compilation before the application begins execution. Dynamic features can provide flexibility and power which is missing from familiar statically compiled programs. In many situations, however, static compilation of a program permits a smaller and less complex runtime, and provides greater certainty about the program's behavior during testing and/or when checking the program for malware. Accordingly, new ways to balance static and dynamic functionality can be useful and concrete advances in computer programming.

SUMMARY

Some embodiments described herein are directed to the technical challenge of supporting reflection while reducing or eliminating reliance on JIT compilation and large runtime platforms. Some are directed to the technical problem of supporting semantic characteristics which were selectively assigned to types, fields, methods, or virtual methods of a computer program. Some are directed to the technical problem of reducing runtime requirements in target environments such as smartphones and tablets. Some are directed to the technical problem of expanding the capabilities of ahead-of-time compilation, in order to facilitate application behavior testing. Some embodiments provide tools and techniques directed to the technical problem of managing metadata in a manner that distinguishes between reflection and introspection, with associated risks of runtime errors. Those of skill in the programming art will also recognize other technical problems addressed by the innovations described herein.

Some embodiments perform a compilation which supports dynamic behavior of a statically compiled computer program in a reduced runtime support environment on a smartphone, a tablet, or a laptop, for example. In some embodiments, the statically compiled computer program is fully executable without any use of just-in-time compilation. A runtime behavior characteristics description specifies whether certain metadata are to be included within an execution scope of the computer program. In some embodiments, the runtime behavior characteristics description expressly differentiates between metadata which supports inspection and metadata which supports method invocation or field access.

During a static ahead-of-time compilation of the computer program in some embodiments, a mapping is created between metadata within the execution scope and a native code runtime artifact. For example, the mapping may connect (a) type definition metadata and a runtime type description, or (b) method definition metadata, a runtime type description, and a location of native code for a method in the statically compiled computer program, or (c) field definition metadata, a runtime type description, and a location of a field in the statically compiled computer program.

In some embodiments, a runtime type description of a type provides a garbage collection layout of the type and/or a list of implemented interfaces of the type. In some, a runtime type description includes type-specific metadata from an executable file. In some embodiments, including some that are based on a Microsoft System.Reflection namespace, a runtime type description represents the same type metadata as a type definition handle in a system reflection metadata native format collection.

In some embodiments, a static ahead-of-time compilation creates a mapping between runtime artifacts. For example, this mapping may connect (a) a generic type instance, a runtime type definition description, and a runtime type argument description, or (b) a runtime array description, and a runtime array element description, or (c) a location of native code for a static type initialization in the statically compiled computer program, and a runtime type description.

Some embodiments generate trampoline code to support a reflection invocation of an artifact in the reduced runtime support environment. For example, the trampoline code may be code which upon execution (a) performs a virtual method call, abstract method call, or interface method call, (b) performs a call-time bounds check, or (c) performs a calling convention conversion. In some cases, the trampoline code represents a compiler-intrinsic method, namely, a method that would conventionally lack a method body because it is inlined into its callers during compilation.

Some embodiments support runtime diagnostics by including within the statically compiled computer program metadata containing a method name, even though the statically compiled computer program excludes any native code for the method. Some embodiments include within the statically compiled computer program metadata containing a type name, even though the statically compiled computer program excludes any native reflection code for the type.

In some embodiments, the runtime behavior characteristics description is provided by directives. For example, a directive may specify that a type T of the computer program is a required type, or that T is an optional type in, or that T is a prohibited type in the environment. Similarly, another directive may specify that a type member (e.g., a field F, a method M, or a virtual method V) of the computer program is a required type member in the environment, is optional, or is prohibited in the environment. In some cases, a directive specifies that a degree D is enabled for a type T in the environment, or that D is disabled, and in some cases a directive specifies that a degree D is enabled for a type member F, M, or V in the environment, or that D is disabled for the member in the environment.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 1 is a block diagram illustrating a computer system having at least one processor and at least one memory which interact with one another under the control of software for supporting specified dynamic runtime behavior characteristics of types and type members of a computer program in a target runtime environment, the target runtime environment not necessarily being the same environment as a compilation environment in which the computer program has been compiled, is being compiled, or will be compiled, with FIG. 1 also illustrating other items in an operating environment which may be present on multiple network nodes, and with FIG. 1 also illustrating configured storage medium (as opposed to mere signal) embodiments, and with the operating environment being illustrative of the compilation environment and also illustrative of the target runtime environment;

DETAILED DESCRIPTION

Overview

Under previous approaches, reflection semantics have been provided only by an execution engine (sometimes called a runtime). In such a conventional managed environment with just-in-time (JIT) compilation, for example, the execution engine is fully aware of type layout, native code locations, and their relationships with metadata; runtime artifacts such as code and garbage collection descriptors for types are built from metadata in the runtime. Such execution engines contain a large amount of metadata in order to handle a wide range of possible dynamic behaviors, and they can receive code and runtime type descriptions at runtime through JIT compilation. Such a conventional execution engine supported by JIT compilation can readily answer questions about named field offsets, or named method addresses, and it can create new runtime artifacts based on the existing metadata. In particular, Microsoft® .NET APIs have traditionally exposed rich reflection APIs that operate by using (a) metadata, and (b) a way to connect the metadata to runtime artifacts such as methods, fields, or structures which describe types (marks of Microsoft Corporation).

However, one price paid for the execution engine's flexible awareness and capabilities is storage space. If dynamic behavior was not supported, the execution engine could be much smaller. When a program is compiled ahead-of-time, the program's type layouts and code layouts are fully determined at the time of compilation. The runtime services that managed computer programs compiled ahead-of-time need at execution time are relatively small.

Some embodiments described herein provide both (a) support for dynamic behavior such as operational reflection APIs, and (b) relatively small execution engines. To save disk space, metadata information that is not explicitly needed by a reduced size runtime is no longer preserved in the compiled program module—only a reduced (or even a minimal) collection of metadata is included. In some of these embodiments reflection is supported in a fully ahead-of-time compilation system, removing any reliance on a JIT compiler to perform reflection. JIT compilers may be present in such an environment, and may even be used by other software, but in these particular embodiments the ahead-of-time compiled application performs reflection and/or other dynamic behaviors without relying on the JIT compiler. To help keep the size on disk of compiled modules small, some embodiments treat reflection data as entirely optional, in the sense that the presence of certain "extra" metadata is not needed for the operation of the runtime environment and is only used to implement the reflection API functionality. This approach provides considerable savings in size on disk, since the set of artifacts that have this extra metadata can be restricted to a set of artifacts that are actually used in reflection scenarios.

Some embodiments extract the reflection metadata from input modules, and some generate mappings. Some generate one or more metadata—artifact mappings between the extracted metadata and runtime artifacts that are produced during native code generation. Some examples of metadata—artifact mappings include mappings (a) between type definition metadata and a runtime type description (RTD) structure describing the type within the minimal runtime, (b) between the RTD, method definition metadata and the location of machine code for a method within the executable module, and/or (c) between the RTD, field definition metadata, and the runtime location (or offset) of the field. Some embodiments generate one or more artifact—artifact mappings between the runtime artifacts, such as (a) mappings that describe composition of generic type instances into RTDs for type definition and type argument(s), (b) mappings that describe array type composition by connecting RTDs for an array and an array element, (c) mappings from RTDs to the location of the machine code that performs static type initialization, e.g., class constructor code. Some embodiments generate and/or include a list of RTDs that are not allowed in reflection scenarios.

Some embodiments generate one or more pieces of code which is specifically designed to support dynamic behavior in an ahead-of-time compiled program; these codes are referred to collectively herein as "trampoline code". For example, some embodiments generate support code that enables reflection invocation of virtual and interface methods. Some generate support code that enables reflection invocation of methods that require additional checks at the call site, such as bounds-checking. Bounds-checking may test for out-of-bound array accesses, bad pointers, and/or invalid numeric values. Some embodiments generate support code that enables calling convention conversion between a reflection API calling convention and a target calling convention of the method. Calling conventions may implicate parameter passing by-reference or by-value, or whether arguments are passed as a single array of objects, for example. Some embodiments generate support code that enables reflection invocation of methods which are implemented as compiler-intrinsic routines.

Some embodiments generate diagnostic infrastructure code that allows the ahead-of-time compiler to run in a mode that adds extra metadata for all runtime artifacts contained in the executable module. In this mode of compilation, the executable module contains additional data that helps in diagnosing runtime errors caused by attempts to use reflection APIs on runtime artifacts that don't carry reflection metadata.

Some embodiments described herein may be viewed in a broader context. For instance, concepts such as behavior, compilation, conversion, execution, mapping, support, time, and types may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving behavior, compilation, conversion, execution, mapping, support, time, and/or types are outside the present scope. Accordingly, vagueness, mere abstractness, lack of technical character, and accompanying proof problems are also avoided under a proper understanding of the present disclosure.

Technical Character

The technical character of embodiments described herein will be apparent to one of ordinary skill in the art, and will also be apparent in several ways to a wide range of attentive readers. First, some embodiments address technical problems such as supporting reflection without JIT compilation, supporting selectively assigned semantic characteristics of a computer program, reducing runtime requirements, expanding ahead-of-time compilation capabilities, and/or managing metadata for reflection and other dynamic behaviors. Those of skill will also recognize other technical problems addressed by the innovations described herein.

Second, some embodiments include technical components such as computing hardware which interacts with software in a manner beyond the typical interactions within a general purpose computer. For example, in addition to normal interaction such as memory allocation in general, memory reads and write in general, instruction execution in general, and some sort of I/O, some embodiments described herein include software for creating and/or using mappings and trampoline codes that are designed to help manage runtime behavior characteristics.

Third, technical effects provided or influenced by some embodiments include the metadata—runtime artifact mappings, mappings between runtime artifacts, the compelled existence of a generic instantiation, and compiler inclusion/exclusion of particular metadata in native code.

Fourth, some embodiments include technical adaptations such as trampoline codes for call site bounds checking, compiler-intrinsic routines, call site calling convention conversion, and other specific functionalities.

Fifth, some embodiments support modified technical functionality of compilers by implementing a runtime behavior description that indicates whether a particular type or type member is (a) required in a target runtime environment, (b) optional in that environment, or (c) prohibited in that environment.

Sixth, technical advantages of some embodiments include the ability to specify type and type member presence and/or absence in a compilation, reduced runtime sizes, reduced runtime processing workloads, and an improved opportunity to fully test an application's behavior before that application is released into a marketplace.

Some Acronyms

AOT: Ahead Of Time
API: Application Program Interface
CD: Compact Disc
CLR: Common Language Runtime
DVD: Digital Video Disc or Digital Versatile Disc
ECMA: former European Computer Manufacturers Association; this acronym has been replaced by non-acronym "Ecma" of Ecma International.
IL: Intermediate Language
JIT: Just In Time
JSON: JavaScript Object Notation
RAM: Random Access Memory
ROM: Read Only Memory
SDL: Simple Declarative Language
XML: eXtensible Markup Language
YAML: YAML Ain't Markup Language Some Terminology Reference is made below to exemplary embodiments such as those illustrated in the drawings, and specific language will be used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are defined explicitly, but quotation marks are not used when a term is defined implicitly. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

An "execution scope" is the set of code for a program that could be reached along at least one execution path of the program. Understanding the phrase "execution scope" includes an acknowledgement that only certain metadata information might be needed during runtime, because only certain metadata can be invoked by the program when it runs, depending on what inputs the program receives from a user, what resources are available in the program's runtime environment, and other factors. For example, code for a routine X is not within the execution scope if the program as presently written will never invoke X.

A "minimal runtime" is an example of a "reduced runtime" or "reduced runtime support", which in turn can be measured as follows: a runtime R-reduced is a reduced runtime if it functions as a replacement for another runtime R-larger but R-reduced takes up less nonvolatile storage space than R-larger as a result of containing less metadata than R-larger. A minimal runtime for a given program is a runtime which requires no metadata outside the program's execution scope.

"Metadata" means one or more of the following: a type name, a type member name, a type layout for garbage collection purposes, a type member layout for garbage collection purposes, an item which is designated as metadata in any past or current version of the ECMA-335 standard. In particular, in a given embodiment the metadata format may conform fully, partially, or not at all to the ECMA-335 standard, and third-party code may be authored to work with one or more metadata formats.

A "runtime behavior characteristics description" (also called a "runtime behavior description") is a concrete description in a digital format which explicitly or implicitly identifies a set of runtime artifacts for which runtime support data is to be generated during compilation. In a given embodiment, this set of artifacts contains: (a) type definitions and/or type instantiations, along with (b) an indication of what kind of runtime support data is to be generated for each such type or type instantiation, and for each (c) a list of type members (methods, fields, events, and/or properties) and the kind of runtime support data to be generated for each of the members. The kind of runtime support data to be generated can be a metadata description and/or a runtime mapping. The runtime behavior characteristics description can be in a human-readable format, or not. It can be in a serializable format, or not.

One example of a runtime behavior characteristics description includes one or more directives described in the '029 application, which is incorporated herein by reference. For jurisdictions which do not permit incorporation by reference, information from that application is reproduced below and hence made part of the present application as well.

In some embodiments, a human or software process user obtains a directives document from digital storage. The directives document is intended to help manage runtime behavior characteristics of types and type members of a computer program in a runtime environment. The environment may be, for example, a smartphone or a tablet which has a reduced size runtime, relative to familiar runtimes. The computer program has a source code which is written in at least one data-typed programming language.

In some embodiments, the user may obtain the directives document by reading a directives document file that has already been generated, or the user can obtain the directives document by generating it, for example. The directives document contains human-readable directives in a format which is also parsable by software, such as an XML, JSON, YAML, or SDL format. Unlike approaches which annotate source code with semantic attributes, the directives of the directives document are not interleaved with the source code of the computer program to which the directives pertain. As a result, access to the source code is not necessarily required for effective use of the directives. In particular, the program's source code is not required in order to modify an applicable directives document by adding a directive, deleting a directive, or altering a directive. A given program may be subject to different directives documents, which are tailored for example to different runtimes.

Upon inspection by the user, the directives document discloses various runtime behavior characteristic directives. For example, a directive may specify that a type T of the computer program source code is a required type 218 in the environment, or that T is an optional type in the environment, or that T is a prohibited type in the environment. Similarly, another directive may specify that a type member T-M of the computer program source code is a required type member 228 in the environment, is optional, or is prohibited in the environment. In some cases, a directive specifies that a degree D is enabled for a type T in the environment, or that D is disabled, and in some cases a directive specifies that a degree D is enabled for a type member T-M in the environment, or that D is disabled for T-M in the environment.

In some embodiments, directives may reference a group of program items; some examples include the following group runtime behavior characteristic directives: an Application directive, a Library directive, an Assembly directive, a Namespace directive. In some embodiments, directives may reference components of a group, such as the following group component runtime behavior characteristic directives: a Type directive, a TypeInstantiation directive, a Method directive, a MethodInstantiation directive, a Field directive, a Property directive, an Event directive. In some embodiments, directives can force the existence of a generic instantiation, provided the compiler given the directives complies with the directives. In some embodiments, directives may make indirect reference to types; some examples include the following param runtime behavior characteristic directives: a Parameter directive, a TypeParameter directive, a GenericParameter directive.

In some embodiments, directives may be able to reference one or more of the following degrees: an activation degree which refers to runtime activation of type instances via reflection; a browse degree which refers to allowing runtime introspection over types via reflection; a dynamic degree which refers to runtime access via reflection; a runtime serialize degree which refers to enabling reflection support for reflection-based serialization and/or deserialization; or a static serialize degree with refers to statically synthesized serialization in a particular format such as XML or JSON. In some embodiments, permitted degree values include two or more of the following: Required-All, Required-PublicAndInternal, Required-Public, All, PublicAndInternal, Public, Included, Auto, or Excluded. Within a given embodiment and environment, degrees may apply to types 218, their instance constructors, their property setters, their property getters, fields 226, and/or all type members 228. In some embodiments, degrees are automatically propagated through related types and type members.

In some embodiments, directives are submitted to an ahead-of-time compiler to indicate the following for use during compilation: (a) whether degree D applies to type T, (b) whether degree D applies to type member T-M, (c) whether type T is required, and (d) whether type member T-M is required. If a type T or type member T-M is not required (at least according to the directives document), then the compiler and the runtime can reduce space and processing requirements accordingly by omitting dynamic support for T or for T-M, respectively. To determine what the submitted directives indicate for a given type T or a given type member T-M, the compiler in some embodiments finds all directives that apply to T (or to T-M, as the case may be), applies composition rules to produce a composite directive, and then determines the result from the composite directive. The compiler then compiles at least a portion of the computer program source code into native code as directed by the directives document.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accessing, adding, allowing, altering, applying, avoiding, behaving, compiling, composing, containing, converting, creating, deleting, deserializing, directing, disabling, disclosing, enabling, executing, extracting forcing, formatting, generating, inspecting, interpreting, locating, maintaining, managing, mapping, modifying, obtaining, parsing, producing, prohibiting, reading, receiving, reciting, referring, requiring, serializing, storing, submitting, supporting, targeting, utilizing, writing, and accesses, accessed, adds, added, etc., with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. Unless expressly stated otherwise in a claim, a claim does not cover a signal per se. For the purposes of patent protection in the United States, a memory or other computer-readable storage medium is not a propagating signal or a carrier wave outside the scope of patentable subject matter under United States Patent and Trademark Office (USPTO) interpretation of the In re *Nuijten* case.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise, "computer readable medium" means a computer readable storage medium, not a propagating signal per se.

Operating Environments

Figure 1:
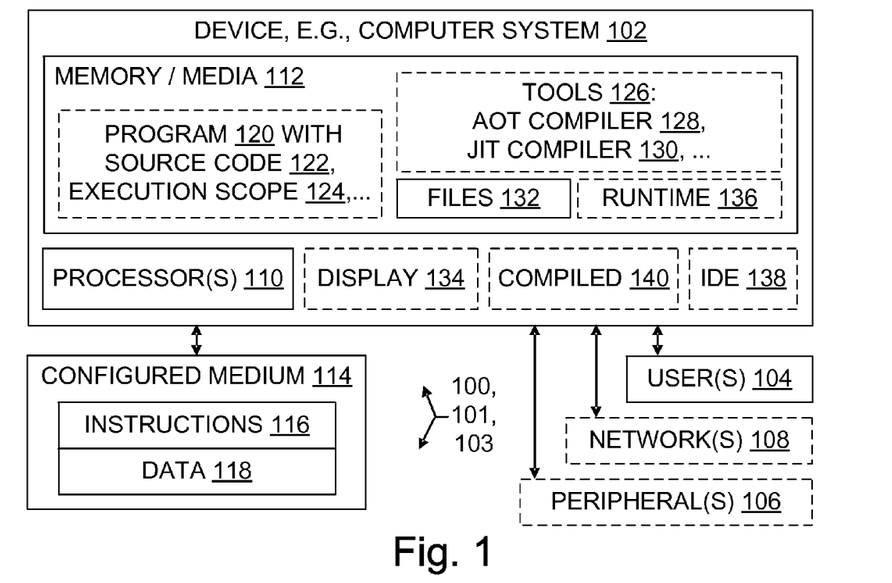

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

One of skill will appreciate that the foregoing aspects and other aspects presented herein under "Operating Environments" may also form part of a given embodiment. This document's headings are not intended to provide a strict classification of features into embodiment and non-embodiment feature classes.

As another example, a game may be resident on a Microsoft XBOX Live® server (mark of Microsoft Corporation). The game may be purchased from a console and it may be executed in whole or in part on the server, on the console, or both. Multiple users may interact with the game using standard controllers, air gestures, voice, or using a companion device such as a smartphone or a tablet. A given operating environment includes devices and infrastructure which support these different use scenarios.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact in technological ways with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, nonvolatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable nonvolatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se.

The medium 114 is configured with instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., desktop computer, server computer, smartphone, tablet, laptop, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In some of the illustrated environments 100, one or more applications or other programs 120 have source code 122 with routines, an execution scope 124 and other aspects. Software development tools 126 such as ahead-of-time compilers 128, just-in-time compilers 130, debuggers, and profilers, assist with software development by producing and/or transforming source code 122 into native code, intermediate language code, and/or another compiled form 140. Code which has been partially compiled, such as intermediate language code or bytecodes, may also be subject to further compilation into a native code format. Source code 122, compiled code 140, and other information is often stored in files 132 kept in nonvolatile storage 112, from which it is read into volatile working memory 112. More generally, the code 122, tools 126, and other items shown in the Figures and/or discussed in the text, may each reside partially or entirely within one or more hardware media 112, thereby configuring those media for technical effects which go beyond the "normal" (i.e., least common denominator) interactions inherent in all hardware-software cooperative operation. In addition to processors 110 (CPUs, ALUs, FPUs, and/or GPUs), memory/storage media 112, display(s) 134, and battery(ies), an operating environment may also include other hardware, such as buses, power supplies, wired and wireless network interface cards, and accelerators, for instance, whose respective operations are described herein to the extent not already apparent to one of skill. CPUs are central processing units, ALUs are arithmetic and logic units, FPUs are floating point processing units, and GPUs are graphical processing units.

The operating environment 100 is illustrative both of a compilation environment 101 in which a given program is compiled and of a target runtime environment 103 in which the compiled program executes, in the sense that each environment 100, 101, 103 includes processor(s) 110 and memory 112, and each environment 100, 101, 103 also often includes other items shown in FIG. 1. However, one of skill will understand that many programs are compiled in one environment and then executed in a different environment, so the mere fact that one Figure helps illustrate both environments 101 and 103 does not mean that everything present in one of those environments is necessarily present in the other. In particular, the compilation environment 101 will contain a static compiler 128 and source code 122 that are not necessarily present in the runtime environment 103, and the runtime environment 103 will contain a runtime 136 that is not necessarily present in the compilation environment 101.

A given compilation environment 101 may include an Integrated Development Environment (IDE) 138 which provides a developer with a set of coordinated software development tools 126 such as compilers, source code editors, profilers, debuggers, and so on. Some of the suitable operating environments 100 for some embodiments include or help create a Microsoft® Visual Studio® development environment (marks of Microsoft Corporation) configured to support program development. Some suitable operating 100 environments include Java® environments (mark of Oracle America, Inc.), and some include environments which utilize languages such as C++ or C# ("C-Sharp"), but teachings herein are applicable with a wide variety of programming languages, programming models, and programs, as well as with technical endeavors outside the field of software development per se.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment. FIG. 1 is provided for convenience; inclusion of an item in FIG. 1 does not imply that the item, or the describe use of the item, was known prior to the current innovations.

Systems

Figure 2:
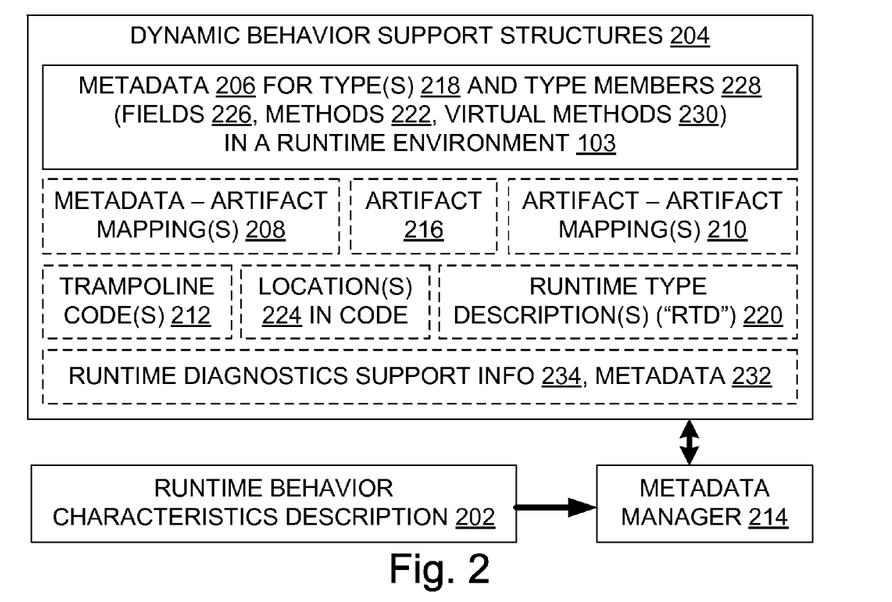
FIG. 2 is a block diagram illustrating aspects of dynamic behavior support structures in an example architecture.

FIG. 2 helps illustrate aspects of an architecture which is suitable for use with some embodiments; other Figures are also referenced below. In one embodiment, a computer system 102 includes a logical processor 110 in the form of one or more single core and/or multicore processors, and a memory 112 in operable communication with the logical processor 112. The memory 112 includes RAM, a hard disk, and/or other volatile or nonvolatile storage device(s). A computer program source code 122 and/or other compiler input such as intermediate language code, bytecode, or assembly language code, resides in at least one file 132 in the memory.

The source code 122 may span one or more files 132. The source code 122 is written at least partially in at least one data-typed programming language, e.g., a C-family language, a BASIC language, one of the Common Language Infrastructure languages such as those discussed in standards ECMA-334 and ECMA-335, or one of the many other familiar or hereafter-developed data-typed programming languages. Unless stated otherwise, it is assumed herein that the source code 122 and other compiler inputs are free of conventional errors that would prevent compilation 618, such as programming language syntax errors, undefined identifiers, references to undeclared functions, static type violations, undefined instructions, and so on. A static compiler 128, also referred to herein as an ahead-of-time compiler or an AOT compiler, is part of the system 102.

A directives document or other runtime behavior characteristics description 202 resides in the memory 112. The runtime behavior characteristics description 202 specifies to a metadata manager 214 whether certain dynamic behavior support structures 204 (also called "runtime support data" herein) are to be included within an execution scope 124 of the computer program 120. The metadata manager 214 may be implemented as part of an innovative AOT compiler 128, or as a separate tool 126, for example. In some embodiments, the runtime behavior characteristics description 202 specifies that runtime mappings 208, 210 are to be generated and included in compiler output 140. In some, the description 202 expressly differentiates between metadata 206 which supports inspection and metadata 206 which supports method 222, 230 invocation or field 226 access. In some embodiments, the description 202 specifies that trampoline code 212 is to be generated and included in compiler output 140.

Figure 3:
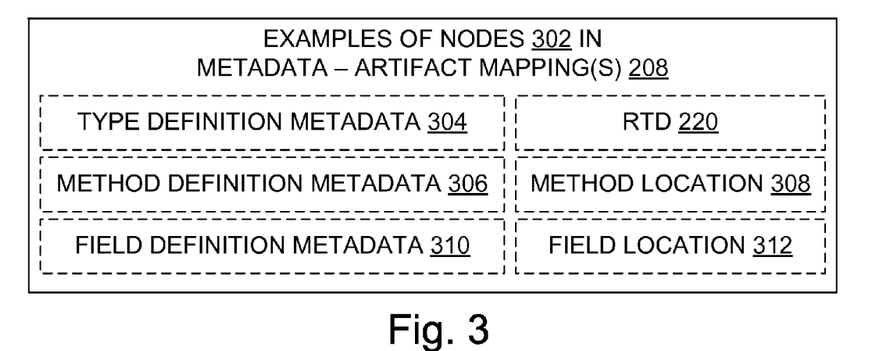
FIG. 3 is a block diagram further illustrating metadata—artifact mappings in some embodiments consistent with that aspect of FIG. 2.

During a static ahead-of-time compilation of the computer program 120 in some embodiments 101, a mapping 208 is created between nodes 302 which include metadata 206 within the execution scope and at least one native code runtime artifact 216. For example, the mapping 208 may connect type 218 definition metadata 304 and a runtime type description 220. The mapping 208 may instead or in addition connect method 222 definition metadata 306, a runtime type description 220, and a location 224, 308 of native code 140 for a method in the statically compiled computer program. The mapping 208 may instead or in addition connect field 226 definition metadata 310, a runtime type description 220, and a location 224, 312 of a field in the statically compiled computer program.

In some embodiments, a runtime type description 220 of a type 218 provides a garbage collection layout of the type and/or a list of implemented interfaces of the type. In some, a runtime type description 220 includes type-specific metadata 206 from an executable file. In some embodiments, including some that are based on a Microsoft System.Reflection namespace, a runtime type description 220 represents the same type metadata as a type definition handle in a system reflection metadata native format collection.

Figure 4:
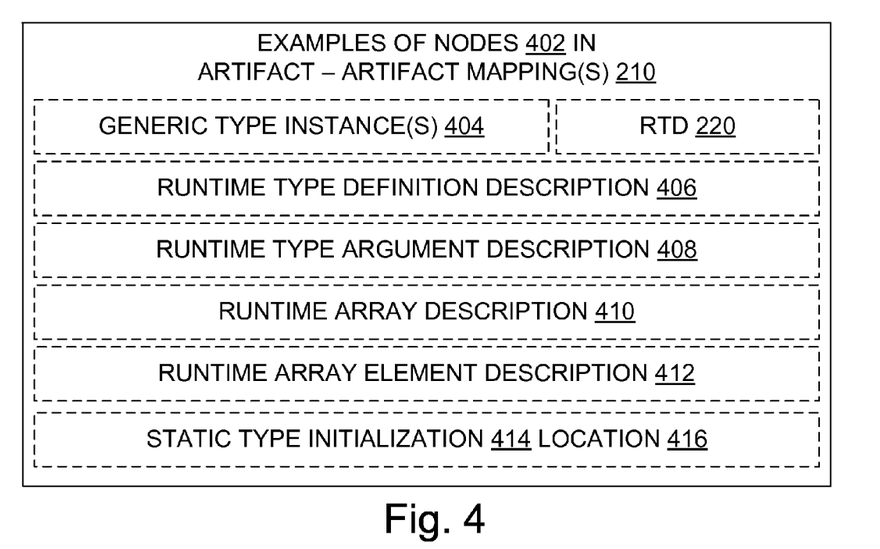
FIG. 4 is a block diagram further illustrating artifact—artifact mappings in some embodiments consistent with that aspect of FIG. 2.

In some embodiments, a static ahead-of-time compilation creates a mapping 210 between nodes 402 which include various runtime artifacts 216. For example, this mapping 210 may connect a generic type instance 404, a runtime type definition description 406, and a runtime type argument description 408. The mapping 210 may instead or in addition connect a runtime array description 410, and a runtime array element description 412. The mapping 210 may instead or in addition connect a location 224, 416 of native code for a static type initialization 414 in the statically compiled computer program, and a runtime type description 220.

Figure 5:
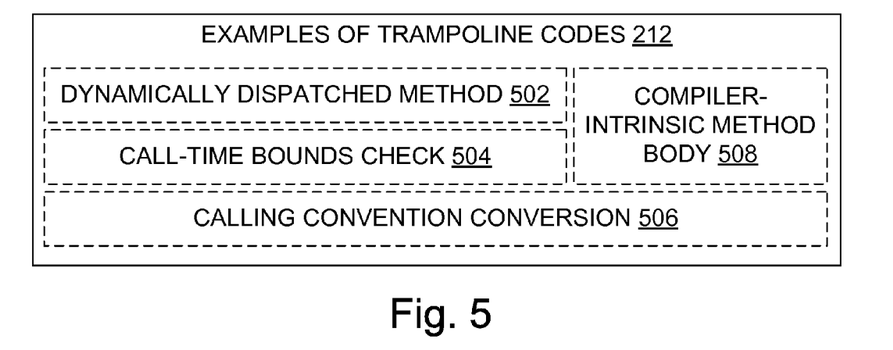
FIG. 5 is a block diagram further illustrating trampoline codes in some embodiments consistent with that aspect of FIG. 2.

Some embodiments generate trampoline code 212 to support a reflection invocation of an artifact 216 in the reduced runtime support environment 103. For example, the trampoline code 212 includes code which upon execution performs a dynamically dispatched method (DDM) call 502 for a virtual method, an abstract method, or an interface method. Although these DDM methods have differences in some language implementations with respect to being overridden and/or being hidden, they each utilize at least one slot in a virtual table (a.k.a vtable) and each provides developers with some ability to select the method's implementation at runtime. In some embodiments, the trampoline code 212 includes code which performs a call-time bounds check 504. In some embodiments, the trampoline code 212 performs a calling convention conversion 506. In some cases, the trampoline code 212 represents a compiler-intrinsic method 508 that is inlined during compilation. Additional details regarding possible implementations of trampoline code a given elsewhere herein.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches, or an embodiment in a computer system may operate without communicating with other computer systems.

Many embodiments reside and operate on a single device, such as a particular laptop or workstation or server box. However, some more extensive embodiments operate in a "cloud" computing environment and/or a "cloud" storage environment in which computing services are not owned but are provided on demand. For example, the runtime behavior characteristics description 202 and the innovative AOT compiler 128 guided by that description 202 may be on a development system 102 in a networked cloud, source code 122 may be initially stored in other devices (servers) within the cloud, and the compiled application program 120 may be sent to yet another cloud device 102 such as a consumer's smartphone or tablet.

Processes

Figure 6:
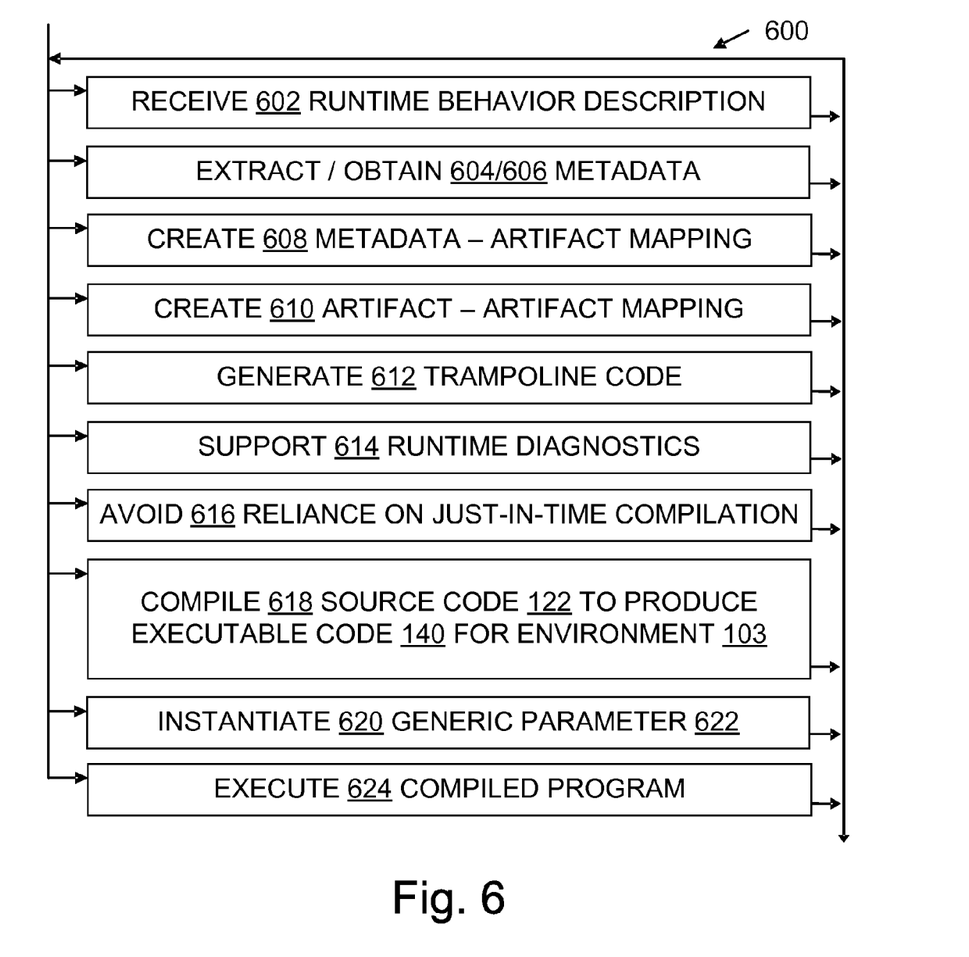
FIG. 6 is a flow chart illustrating steps of some process and configured storage medium embodiments described herein.

FIG. 6 illustrates some process embodiments in a flowchart 600. Technical processes shown in the Figures or otherwise disclosed may be performed in some embodiments automatically, e.g., by a compiler 128 under control of a runtime behavior characteristics description 202 and requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-tobottom order that is laid out in FIG. 6. Steps may be performed serially, in a partially overlapping manner, or fully in parallel. The order in which flowchart 600 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

In some embodiments, a software compilation process for supporting dynamic behavior of a statically compiled computer program in a reduced runtime support environment includes receiving 602 a runtime behavior characteristics description 202 that specifies whether certain metadata are to be included within an execution scope of the computer program. The process also includes extracting 604 or otherwise obtaining 606 a copy of some metadata which are within the execution scope of the computer program according to the runtime behavior characteristics description 202. Depending on the particulars of the description 202, the process then creates 608 zero or more metadata-artifact mappings 208, creates 610 zero or more artifact-artifact mappings 210, and generates 612 zero or more pieces of trampoline code 212. Aspects of these steps 608-612 are implicit in the mappings 208, 201 and/or in the codes 212, and understanding of the process will thus be informed by understanding the mappings and the trampoline codes, which are illustrated elsewhere herein by examples.

Some embodiments support 614 runtime diagnostics by including within the statically compiled computer program metadata 232 containing a method name, even though the statically compiled computer program excludes any native code for the method. Some embodiments support 614 runtime diagnostics by including within the statically compiled computer program metadata 232 containing a type name, even though the statically compiled computer program excludes any native reflection code for the type. In some embodiments diagnostic information 234 includes a mapping from a runtime type description to a type's name, which is used at runtime to look up the type's name for use in error messages when the type is used in a reflection API but was not specified in the runtime behavior characteristics description as a type which requires reflection metadata. Some embodiments include a similar mapping from a native code address to a method and a name of the method's type.

During execution of a suitably enhanced AOT compiler 128 by the logical processor(s) 110 in some embodiments, the compiler 128 compiles 618 at least a portion of the computer program source code 122 from source code file(s) 132 into at least one native code file 132 or other compiled 140 file, and does so as directed by the description 202. For example, when directives in the description 202 specify that a runtime serialization degree is enabled for a type T, then one innovative compiler 128 generates a description of T's garbage collection layout and a list of T's implemented interfaces and maps that metadata to native code representing T. When directives in the description 202 specify that another type T1 has a browse degree which disables reflection but permits introspection, this compiler 128 generates metadata with T's member names and their types but does not create a runtime mapping to native code or a description of T's garbage collection layout. This compiler 128 implementation also generates 612 trampoline code for interface methods and for virtual methods, for methods that have bounds checks when called, and for calling convention conversion between a reflection API and a called method's calling convention. Other examples and descriptions of compiler 128 activity or forbearance in response to directives of a description 202 are provided in the '029 application identified above and incorporated herein by reference. In some embodiments, an innovative compiler 128 executes instructions 116 which output native code 140 instantiating 620 a generic parameter 622 in response to a runtime behavior characteristic description 202.

By way of steps 608, 610, and/or 612, some embodiments remove 616 any reliance on JIT compilation by a given native code version of a program within a particular runtime environment 103. The runtime environment 103 may be, for example, located within a smartphone or a tablet. Some environments 103 utilize a reduced size runtime 136 which is relatively small in comparison to familiar larger runtimes for multi-language platforms like those previously provided by Microsoft Corporation, Google, Inc., Oracle Corporation, or Xamarin, Inc., for example. Some embodiments permit compiled programs 120 to exhibit dynamic behavior such as reflection during execution 624 yet avoid 616 reliance on JIT compilers 130.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured into an embodiment using items such as a runtime behavior description 202, dynamic behavior support structures 204 and a metadata manager 214, in the form of data 118 and instructions 116, read from a removable medium 114 and/or another source such as a network connection, to form a configured medium. The configured medium 112 is capable of causing a computer system to perform technical process steps for managing runtime behavior characteristics as disclosed herein. FIGS. 1 through 6 thus help illustrate configured storage media embodiments and process embodiments, as well as system and process embodiments. In particular, any of the process steps illustrated in FIG. 6, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion is derived in part from some Project N documentation. Project N is a multipart development project of Microsoft Corporation which includes, but is not limited to, advancements in program runtime support and compiler technology which will be made commercially available in due course under a Microsoft® .NET Native brand (marks of Microsoft Corporation). Aspects of some Project N programs and/or documentation are consistent with or otherwise illustrate aspects of the embodiments described herein. However, it will be understood that Project N documentation and/or implementation choices do not necessarily constrain the scope of such embodiments, and likewise that Project N and/or its documentation may well contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

In some embodiments, a metadata manager 214 component of a compiler generates metadata for a set of artifacts. One approach presumes that the set of artifacts is determined by another component, such as a component that creates a directives document 202 as described in the incorporated-by-reference disclosure of the '029 application. Thus, an implementation under Project N assumes that the set description 202 is an input to the compilation system described herein. This set description 202 contains: type definitions or type instantiations, along with the kind of data to be generated for the type or type instantiation, along with a list of members (methods, fields, events, properties) and the kind of data to be generated for each of them. The kind of data to be generated can be either "metadata description" or "runtime mapping", or both.

Another input to one compilation system is an IL assembly module which is to be compiled into native code. More generally, various intermediate languages may be used as compiler input according to the teachings herein, such as Common Intermediate Language (formerly referred to as Microsoft Intermediate Language or MSIL), assembly language for a given processor family, or even C program language code, since C is sometimes used as an intermediate language.

Metadata Generation

When an input module is passed to the ahead-of-time compiler 128 the metadata manager 214 determines which artifacts need metadata. Then a file is generated that contains metadata information for these artifacts. This file generally contains metadata for all the artifacts that were determined from the description 202 to need "metadata description". However, data pertaining to generic type instances may be omitted. In one implementation, this generated metadata file is separate from (not part of) the metadata used by the minimal runtime. In one implementation, extracted 604 information mirrors the metadata about types and members that is stored in an original input module in the form of tables and blobs as defined in the Common Language infrastructure (ECMA 335) standard.

In some embodiments, the generated metadata file 206 is separate from the metadata 118 used by the minimal runtime in the sense that the use of any of the generated metadata is not required by any portion of the lowest level of a reduced size or minimal runtime. This provides a strongly layered model: the lowest layers don't require the metadata and know very little about its format and semantics. All usage of the generated metadata is implemented in layers above this minimal runtime, an approach which has the advantage of pushing policy about that metadata up into those layers. Metadata policy addresses issues such as whether metadata should be present, and if so how much of it is present and how it should be used. This enhances the flexibility of the minimal runtime; making it pay for play; alternative usages of the runtime not interested in using any of this data 206 do not have to generate it and don't pay any cost for the feature they don't use. This approach also makes it much more likely that the runtime doesn't need to be updated frequently; the less code and policy is embedded in the runtime, the less scope exists for errors in that code and policy. By contrast with a familiar desktop CLR, there is a resource cost to a user even if that user does not use any metadata based feature (e.g., reflection), such as slightly more memory used or longer code paths, because the lowest layer of the CLR is where some of that core functionality is embedded.

In the Project N scenario a minimal runtime 136 exports a set of fundamental functionality, which is quite low level and supports an extremely minimal set of semantics that might be considered as reflection. The minimal runtime understands and includes within itself only a minimal amount of metadata to implement those fundamental operations (type identity, vtables, interface mapping tables, and a few type attributes such as whether a type is an array). This minimal metadata 118 is often orders of magnitude smaller than generated metadata (and much simpler in many ways).

In order to build higher level and richer metadata on top of this, the runtime 136 does provide the runtime mapping tables 208, 210 in order to map between the minimal metadata and native code attributes that do remain and entries in the generated metadata. But those tables are relatively simple in the Project N implementation: the runtime sees them only as opaque blobs with associated IDs and provides a runtime mechanism to look up those blobs by ID, but the runtime doesn't understand the table contents. The compilation pipeline understands a bit more, but the part of that pipeline which is tightly bound to the runtime (an rhbind binder in this implementation) only understands the native (minimal) sides of the mapping: it has no idea what it is mapping to.

Mapping Tables

A metadata file such as one generated consistent with the preceding paragraphs contains the description of the types 218 within the final module 140, but this information does not have links into the runtime structures 216 generated during compilation 618, such as structures representing the types within a minimal runtime 136 or the actual machine code 140 for the methods. In one implementation, a mapping table 208 is generated 608 as part of the metadata generation; the mapping table 208 describes a mapping between runtime constructs 216 and the data 118 generated in the separated metadata 206 file. A mapping table 210 between runtime constructs 216 is also generated 610 in some implementations. Mappings 210, 210 are dependent on implementation details of a given compiler and a given runtime, but one of skill in the art will understand those implementation details sufficiently to apply the teachings herein for the environment 103 that is targeted.

Supporting Code Generation

In some cases, for reasons noted below and/or readily apparent to one of skill in the art, machine code in the module is not suitable to be directly referenced by the mapping tables. In some of these cases, the ahead-of-time compiler 128 also generates 612 trampoline code to support reflection invocation. This trampoline code performs additional tasks before redirecting the program control flow to the method to be invoked through reflection, e.g., when using the Microsoft® .NET reflection APIs (mark of Microsoft Corporation). Some examples are discussed below.

Supporting Code for Invocation of Virtual and Interface Methods

In the case of virtual methods and other dynamically dispatched methods, one cannot readily determine the location of the method body without knowing the exact type of the object a system will try to execute the method on (and its vtable slot). The matter of performing a dispatch to a virtual method is particularly involved for methods which are not readily represented by a v-table slot, such as interface methods and generic virtual methods. When this information is known at the time of compilation, the compiler 128 generates a small "trampoline" method 502 for each dynamically dispatched method that is referenced from the mapping table. The body of the trampoline method performs the proper vtable dispatch using the same mechanism as a regular virtual method call, abstract method call, or interface method call. The mapping table uses the location of this trampoline method whenever a location of a virtual (or abstract or interface) method is needed; this approach can greatly reduce complexity at runtime. One example follows:

```
abstract void SomeMethod( ) { ... }
void SomeMethod$Trampoline( ) { return SomeMethod( ); }
```

Supporting Code for Methods that do Checks at the Call Site

In a similar fashion to virtual methods, some embodiments generate 612 a trampoline method whenever a location of a method with additional call site requirements is implicated. The compiler 128 will verify the call site requirements in the body of the trampoline method and perform a call to the target method. An example of such method 504 is a method with additional bounds check at the time of the call required for one of its parameters.

Supporting Code that Enables Calling Convention Conversion

Some embodiments generate 612 trampoline code 506 which performs calling convention conversion between, for example, a reflection API calling convention and the target calling convention of the destination method. The Microsoft® .NET framework reflection API, for example, traditionally uses an array of objects to invoke a method, as noted in public documentation for MethodBase.Invoke Method (Object, Object[ ]). In order to execute the body of the method, the arguments will be converted and set up on the stack in the way the called method expects. During compilation, some embodiments generate shared trampoline methods 506 that set up the stack in a way the method expects, perform argument conversion when needed, and call the target method.

Supporting Code that Enables Reflection Invocation of Methods that are Implemented as Compiler Intrinsics A compiler intrinsic routine is a method that has a body whose implementation is provided by the compiler. The method is treated as always inlined and has no body in a traditional sense. In order to make the body reflection-invocable, some embodiments create a body 508 that appears to call itself, as in the following pseudocode example:

```
ReturnType IntrinsicMethod(Arguments...)
{
    // this is not a recursive call - the call instruction will be replaced by the
    // compiler with the actual intrinsic code
    return IntrinsicMethod(Arguments...);
}
```

Additional Observations about Directives and Description 202

As noted elsewhere herein, the runtime behavior description 202 may take one or more forms. One form is a directives document 202 as described herein and in the '029 application disclosure incorporated by reference. Another approach that could be used in some implementations would be to let a developer control metadata generation by annotating the source code with ECMA-335 custom attributes. Other approaches will also be apparent to one of skill in the art. In either case, the description 202 contains an input set specifying what types 218 or members 228 need metadata. Concepts such as "Serialize" and "Activate" are translated by the component 214 that processes the directives or other description document into input sets. In that context, and with particular attention to the Project N documentation, the following observations are offered. In them, an EEType is an example of a "runtime type description" (RTD) 220.

Assume the IL assembly defines a type T with a field F, method M and a virtual method V. Assume also that the manager 214 decided the following is needed in this particular situation:

Case 1: No Metadata for T, F, M or V.

Then no separate reflection metadata will be generated for any of these. T, F, M and V can all be used from code (e.g. if t is an object of type T, you can execute code that does "t.F=something", call t.M( ) or t.V( ). Attempting to use the type in reflection APIs will likely not work, unless the operation can be satisfied using metadata of the minimal runtime (described in the EEType). An example of such operation would be type identity (t.GetType( )==typeof(T)).

Case 2: Browse Metadata for T, but No Metadata for any of the Members.

In this case, an embodiment generates separate reflection metadata for T. This separate metadata will include the name of the type, its namespace, and similar identifying information. The embodiment also generates a mapping from the EEType to this separate metadata. This lets one do all of the operations mentions above in Case 1, plus the type can be used in more reflection APIs (such as t.GetType( ).FullName). Asking for the list of members using reflection APIs will return an empty set because none of the members were enabled for metadata (note one can still call t.M( ) from code, outside of the reflection scenarios).

Case 3: Browse+Runtime Mapping for T.

This scenario is equivalent to having only browse for T. This provides a way to ensure type equivalence—a type retrieved from metadata will be equivalent to the EEType it represents.

Case 4: Browse Metadata for T, F, M and V.

This is an extension to Case 3. In the separate metadata, an embodiment also emits a description of F, M, V. When the application 120 uses reflection APIs to enumerate the members of T, it will see F, M and V. It can inspect their types/signatures and names, but attempting to use reflection to invoke the named method or access the named field will fail. The code for M might not even exist in the executable, because all the static uses of the method could have been inlined into methods calling M, for performance reasons.

Case 5: Browse+Runtime Mapping for T, F, M, V.

This case further extends Case 4. Now the embodiment also generates a mapping between the field F and the offset within the object where the data of field F resides. This will let the application 120 use reflection to (a) locate field information on the named field F on T (one could already do this with browse), and in addition (b) use the field information object and an instance of T (t) to access the contents of F using reflection.

Some embodiments will also generate a mapping between metadata and code location for M and V$Trampoline (to perform similar operations with methods), the extra code that will do calling convention conversion, and in addition to that, generate trampoline code T.V$Trampoline to perform the virtual call into T.V. Some will also provide a method body for M in the executable (even if all the static uses got inlined, they will generate a body to make sure M is accessible alone). The compiler doesn't necessarily know the location of V, since V is a virtual method or other dynamically dispatched method, and the location will differ for types deriving from T and overriding V. Attempts to reflection-invoke t.V( ) will actually lead to invoking t.V$Trampoline( ) which in turn calls the proper override of V.

Additional Observations about Reflection Mapping Tables

In some implementations, the reflection mapping tables 208 map runtime data structures emitted into the executable module by the binder to entries (offsets) within a .metadata file. This enables browse-only reflection metadata stored in the .metadata file to be matched with runtime artifacts, enabling scenarios such as reflection-based class instantiation. The tables are generated in a compiler and emitted as an untyped blob with fixups into an IL file. The binder processes the fixups to update the table with offsets to binder-generated runtime structures. Each table is stored in a separate blob with a unique ID. The size of the table can be determined using the Size field of the blob header. At runtime, the mapping tables are accessed by the reflection infrastructure to map metadata handles (which are offsets into the .metadata file) to runtime structures, and map array EETypes to array element EETypes, and so on.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 6 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A software compilation process for supporting dynamic behavior of a statically compiled computer program in a reduced runtime support environment, the process comprising the steps of:

receiving a runtime behavior characteristics description that specifies whether certain metadata are to be included within an execution scope of the computer program;

obtaining a copy of some metadata which are within the execution scope of the computer program according to the runtime behavior characteristics description; and creating a mapping between at least a portion of the obtained metadata and at least one native code runtime artifact generated during a static ahead-of-time compilation of the computer program.

2. The process of claim 1, wherein creating a mapping comprises at least one of the following:
creating a mapping between type definition metadata and a runtime type description;
creating a mapping between method definition metadata, a runtime type description, and a location of native code for a method in the statically compiled computer program; or
creating a mapping between field definition metadata, a runtime type description, and a location of a field in the statically compiled computer program.

3. The process of claim 1, further comprising creating a mapping between runtime artifacts by performing at least one of the following:
creating a mapping between a generic type instance, a runtime type description, and a runtime type argument description;
creating a mapping between a runtime array description, and a runtime array element description; or
creating a mapping between a location of native code for a static type initialization in the statically compiled computer program, and a runtime type description.

4. The process of claim 1, further comprising generating at least one trampoline code to support a reflection invocation of an artifact in the reduced runtime support environment.

5. The process of claim 4, wherein the step of generating at least one trampoline code generates at least one of the following:
a trampoline code which performs a dynamically dispatched method call;
a trampoline code which performs a call-time bounds check;
a trampoline code which performs a calling convention conversion; or
a trampoline code which represents a compiler-intrinsic method that is inlined during compilation.

6. The process of claim 1, further comprising supporting runtime diagnostics by performing at least one of the following sets of steps:
including within the statically compiled computer program metadata containing a method name, and excluding from the statically compiled computer program metadata any native code for the method; or
including within the statically compiled computer program metadata containing a type name, and excluding from the statically compiled computer program metadata any native reflection code for the type.

7. A computer-readable storage medium configured with data and with instructions that when executed by at least one processor cause the processor(s) to perform a technical process for supporting dynamic behavior of a statically compiled computer program in a reduced runtime support environment, the process comprising the steps of:
receiving a runtime behavior characteristics description that specifies whether certain metadata are to be included within an execution scope of the computer program, the runtime behavior characteristics description also expressly differentiating between metadata which supports inspection and metadata which supports at least one of the following: method invocation, field access,
obtaining a copy of some metadata which are within the execution scope of the computer program according to the runtime behavior characteristics description;
creating a mapping between at least a portion of the obtained metadata and at least one native code runtime artifact generated during a static ahead-of-time compilation of the computer program; and
creating a mapping between runtime artifacts of the computer program.

8. The computer-readable storage medium of claim 7, wherein creating a mapping between at least a portion of the obtained metadata and at least one native code runtime artifact comprises at least one of the following:
creating a mapping between type definition metadata and a runtime type description;
creating a mapping between method definition metadata, a runtime type description, and a location of native code for a method in the statically compiled computer program; or
creating a mapping between field definition metadata, a runtime type description, and a location of a field in the statically compiled computer program.

9. The computer-readable storage medium of claim 7, wherein creating a mapping between runtime artifacts comprises at least one of the following:
creating a mapping between a generic type instance, a runtime type definition description, and a runtime type argument description;
creating a mapping between a runtime array description, and a runtime array element description; or
creating a mapping between a location of native code for a static type initialization in the statically compiled computer program, and a runtime type description.

10. The computer-readable storage medium of claim 7, further comprising supporting a reflection invocation of an artifact in the reduced runtime support environment by generating a piece of code which performs at least one of: a virtual method call, or an interface method call.

11. The computer-readable storage medium of claim 7, further comprising generating a piece of code which performs a call-time bounds check, thereby supporting a reflection invocation of an artifact in the reduced runtime support environment.

12. The computer-readable storage medium of claim 7, further comprising generating a piece of code which performs a calling convention conversion, thereby supporting a reflection invocation of an artifact in the reduced runtime support environment.

13. The computer-readable storage medium of claim 7, further comprising generating a piece of code which represents a compiler-intrinsic method that is inlined during compilation, thereby supporting a reflection invocation of an artifact in the reduced runtime support environment.

14. A computer system comprising:
a logical processor;
a memory in operable communication with the logical processor; and
a previously compiled computer program residing in the memory, the previously compiled computer program containing at least one of the following dynamic support structures:
a mapping between metadata and at least one native code runtime artifact;
a mapping between runtime type descriptions, each runtime type description including at least one of the following: a list of implemented interfaces for a type which is in an execution scope of the compiled computer program, or a garbage collection layout for a type which is in an execution scope of the compiled computer program; or at least one piece of code which upon execution by the processor(s) supports a reflection invocation of an artifact of the compiled computer program.

15. The system of claim 14, wherein the compiled computer program is fully executable in the computer system without any use of just-in-time compilation.

16. The system of claim 14, wherein the mapping between metadata and at least one native code runtime artifact comprises at least one of the following:

a mapping between type definition metadata and a runtime type description;

a mapping between method definition metadata, a runtime type description, and a location of native code for a method in the statically compiled computer program; or a mapping between field definition metadata, a runtime type description, and a location of a field in the statically compiled computer program.

17. The system of claim 14, wherein the mapping between runtime type descriptions comprises at least one of the following:

a mapping between a generic type instance, a runtime type definition description, and a runtime type argument description;

a mapping between a runtime array description, and a runtime array element description; or a mapping between a location of native code for a static type initialization in the statically compiled computer program, and a runtime type description.

18. The system of claim 14, wherein the at least one piece of code which upon execution by the processor(s) supports a reflection invocation comprises at least one of the following:

a piece of code which performs a dynamically dispatched method call;

a piece of code which performs a call-time bounds check;

a piece of code which performs a calling convention conversion; or a piece of code which represents a compiler-intrinsic method that is inlined during compilation.

19. The system of claim 14, wherein the previously compiled computer program residing in the memory comprises at least two of the listed dynamic support structures.

20. The system of claim 14, wherein the system comprises at least one of the following: a smartphone, a tablet, a laptop having a removable tablet, or a laptop.

* * * * *